E. CZECZEL.
MOUSE TRAP.
APPLICATION FILED MAR. 26, 1917.
1,231,501.
Patented June 26, 1917.
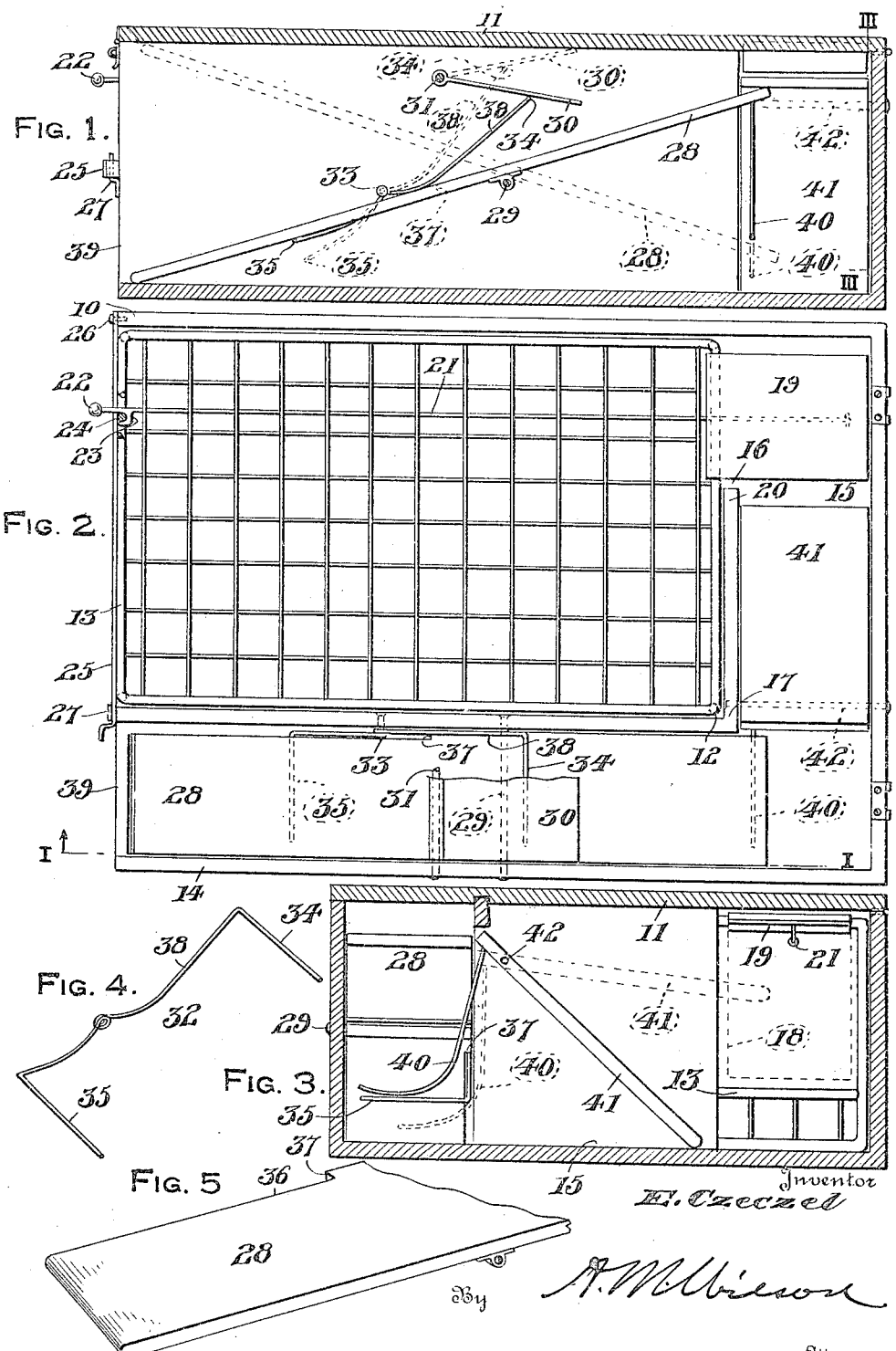

UNITED STATES PATENT OFFICE.

EMIL CZECZEL, OF CHICAGO, ILLINOIS.

MOUSE-TRAP.

1,231,501.  Specification of Letters Patent.  Patented June 26, 1917.

Application filed March 26, 1917. Serial No. 157,412.

*To all whom it may concern:*

Be it known that I, EMIL CZECZEL, a subject of the Emperor of Austria, residing at Chicago, in the county of Cook and State of Illinois, have invented certain new and useful Improvements in Mouse-Traps, of which the following is a specification.

This invention relates to certain new and useful improvements in mouse traps.

The primary object of the invention is the provision of a trap adapted to catch mice by imprisoning them in a live state, means being arranged for transferring or destroying them.

A further object of the device is the provision of a trap having a receiving member for the mice readily removable from the main structure tripping closure means being arranged for the entrance to the cage, all members thereof being readily accessible when desired.

A further object of the device is the provision of a mouse trap having a removable metallic receiving cage for the mice, a guarded entrance run-way or approach being arranged for the cage which may be formed of wood if desired by reason of the fact that the cage is of metal provided with a single metallic closure accessible only from the run-way.

In the drawing forming a part of this application and in which like numerals refer to corresponding parts throughout the several views, Figure 1 is a longitudinal sectional view of the device taken upon line I—I of Fig. 2.

Fig. 2 is a top plan view of the device with the cover or lid removed.

Fig. 3 is a transverse sectional view taken upon line III—III of Fig. 1.

Fig. 4 is a perspective view of the tilting lever employed, and,

Fig. 5 is a perspective view of the outer end portion of the pivoted incline detached.

Referring more in detail to the drawing, the device broadly consists of a box or casing 10 which may be formed of wood or other material having a hinged lid covering 11 and arranged with a main chamber or compartment 12 adapted for the removable reception of a metallic receiving cage 13 while a side passage or run-way 14 connecting with a similar end run-way 15 communicate with an open doorway 16 in the angular or L-shaped partition 17 whereby animals may enter the door-way 18 in the rear end of the cage positioned adjacent the opening 17.

A swinging door 19 is provided for the door-way 18 being hingedly mounted upon the upper rear bar 20 of the cage 13 and having an operating rod 21 attached thereto with its forward end provided with a handle 22 forwardly of the cage, the said bar extending through the latter and having a hook 23 thereon for engaging one of the upright bars 24 of the cage. A latch 25 is pivoted as at 26 to one side of the casing 10 and is arranged spanning the front open end of the chamber 12 with one end thereof adapted to engage a keeper 27 upon the forward end of the partition 17, whereby the cage 13 is normally retained within the chamber 12.

It being understood that the door-way 19 extends through the opening 16 being arranged in its substantially horizontal position as maintained by the rod 21 when in its normal open arrangement whereby the mice may enter the forward end or mouth 39 of the passage 14 thence traveling through the passages 14 and 15 to the opening 16 into the cage.

A tilting incline or platform 28 is arranged in the run-way 14 being journaled at a point slightly forwardly of the middle of said incline upon a pintle 29 carried between the partition 17 and the adjacent side wall of the casing 10.

A guard plate 30 is pivoted above the incline 28 upon a wire 31 arranged transversely of the run-way 14, said plate being normally maintained slightly spaced above the incline by means of a tilting lever 32 pivoted to the partition 17 as at 33 with a parallel annular end 34 beneath the plate 30 and with a lower angular end 35 engaging beneath the incline 28. It will be noted that the incline 28 is provided with a cut-away side portion or notch 36 for accommodating the lever 32 and it is pivoted at 33 so that the ends 34 and 35 are upon opposite sides of the incline, the said notch forming an abutment or shoulder 37 adapted to engage a downwardly curved portion 38 of the lever during the upward pivotal movement of the outer portion of the incline 28 whereby the upper end of the lever 35 is elevated thereby elevating the guard plate 30 to a point substantially parallel above the incline as best illustrated by dotted lines in Fig. 1 of the drawing.

The mouse entering the run-way 14 through the mouth 39 thereof travels upon the incline 28 and moving upwardly thereon to a point beyond the pintle 29 the weight of the mouse tiltingly moves the incline 28, elevating the guard plate 30 for allowing the mouse to pass downwardly over the inner end of the incline. The inner end of the incline 28 engages a depending arm 40 carried by the adjacent end of an obstruction board 41 pivoted as at 42 within the passage 15, whereby the arm 40 is depressed and the board 41 elevated as illustrated by dotted lines in Fig. 3 of the drawing and permitting free passage for the mouse from the incline 28 through the passage 15 and thence from the opening 16 and into the cage 13.

When the mouse leaves the incline 28 the latter is released and the elements slowly returned to their normal position preventing the return of the mouse through the mouth 39, it being noted that it is impossible for the mouse to travel over the top of the board 41 for gaining access to the passage 14. When it is noted that a mouse has entered the cage 13 the rod 21 may be released and the door 19 closed, whereupon a releasing of the latch 25 allows the cage 13 to be removed from the casing 10 for killing or otherwise disposing of the imprisoned mouse. It will be understood that as the cage 13 is alone designed for retaining the live mouse, the remainder of the structure may be formed of wood if desired thereby rendering the device more easily and cheaply manufactured, while the entire contents of the casing 10 is readily accessible by opening the lid 11.

What I claim as new is:—

A trap comprising a casing having a hinged lid and an open forward side, an angular partition within the casing forming a main chamber therein and communicating side and end passages, said partition having an opening therein forming communication between the main chamber and end passage, a removable cage arranged within the said chamber having a door portion adjacent the said opening, a metallic cage removably arranged within the said chamber, a retaining latch for said cage pivoted between one side of the casing and the forward end of said partition, a swinging door at the rear of the cage projecting through the said opening when in its normal elevated position, an adjustable rod for said door extending through the said cage to a point forwardly of the casing and return preventing means arranged within the said passages.

In testimony whereof I affix my signature.

EMIL CZECZEL.